United States Patent
Chang et al.

(10) Patent No.: US 11,691,922 B2
(45) Date of Patent: Jul. 4, 2023

(54) CERAMIC COMPOSITE AND METHOD OF PREPARING THE SAME

(71) Applicant: Industrial Technology Research Institute, Hsinchu (TW)

(72) Inventors: Ming-Hui Chang, Hsinchu County (TW); Hsueh-Ping Weng, Kaohsiung (TW); Sheng-Min Yu, Taoyuan (TW); Kai-Hsiang Chuang, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/547,099

(22) Filed: Dec. 9, 2021

(65) Prior Publication Data

US 2023/0076574 A1    Mar. 9, 2023

(30) Foreign Application Priority Data

Aug. 24, 2021 (TW) ................. 110131249

(51) Int. Cl.
  *C04B 35/581* (2006.01)
  *C04B 22/02* (2006.01)
  *C04B 35/65* (2006.01)

(52) U.S. Cl.
  CPC ............ *C04B 35/581* (2013.01); *C04B 22/02* (2013.01); *C04B 35/65* (2013.01); *C04B 2235/46* (2013.01)

(58) Field of Classification Search
  CPC ....... C04B 35/581; C04B 22/02; C04B 35/65; C04B 2235/46
  See application file for complete search history.

(56) References Cited

U.S. PATENT DOCUMENTS 4,765,831 A * 8/1988 Cochran ................... C22B 7/04
                                              75/589

FOREIGN PATENT DOCUMENTS

| CN | 1095762 A | 11/1994 |
| CN | 1631772 A | 6/2005 |
| CN | 1233477 C | 12/2005 |
| CN | 1752234 A | 3/2006 |
| CN | 1772703 A | 5/2006 |

(Continued)

OTHER PUBLICATIONS

S.F. Yang et al., "Thermal Properties of High Alumina Refractory Derived from Aluminum Dross and Ash", Mar. 2016, pp. 47-56, Taiwan.

(Continued)

*Primary Examiner* — Karl E Group
*Assistant Examiner* — Cameron K Miller (57) ABSTRACT

A ceramic composite and a method of preparing the same are provided. The method of preparing the ceramic composite includes mixing an aluminum slag and a carbon accelerator to obtain a mixture and reacting the mixture at a temperature equal to or greater than 1600° C. in a nitrogen atmosphere to obtain a ceramic composite. The aluminum slag includes aluminum, oxygen, nitrogen, and magnesium. The weight ratio of the oxygen to the aluminum is 0.6 to 2. The weight ratio of the nitrogen to the aluminum is 0.1 to 1.2. The weight ratio of the magnesium to the aluminum is 0.04 to 0.2. The ceramic composite includes aluminum nitride accounting for at least 90 wt % of the ceramic composite.

17 Claims, 6 Drawing Sheets

(56) References Cited

FOREIGN PATENT DOCUMENTS

| | | | |
|---|---|---|---|
| CN | 101574607 | A | 11/2009 |
| CN | 102412123 | A | 4/2012 |
| CN | 103249465 | A | 8/2013 |
| CN | 103320899 | A | 9/2013 |
| CN | 104338428 | A | 2/2015 |
| CN | 104694768 | A | 6/2015 |
| CN | 104973865 | A | 10/2015 |
| CN | 105084904 | A | 11/2015 |
| CN | 105295327 | A | 2/2016 |
| CN | 105503236 | A | 4/2016 |
| CN | 105749480 | A | 7/2016 |
| CN | 106222433 | A | 12/2016 |
| CN | 109420411 | A | 3/2019 |
| TW | 534845 | | 6/2003 |
| TW | 200516066 | | 5/2005 |
| TW | 201200491 | | 1/2012 |
| TW | I401206 | | 7/2013 |

OTHER PUBLICATIONS

Ming-Li Qin et al., "Synthesis of Ultrafine Aluminium Nitride Powder by a Low-termperature Carbothermal Reduction Process", Sep. 2002, vol. 17, No. 5, Journal of inorganic Materials, China.
P.E. Tsakiridis, "Aluminium salt slag characterization and utilization—A review", Elsevier, Journal of Hazardous Materials, 2012, pp. 1-10, Elsevier, US.

\* cited by examiner

CERAMIC COMPOSITE AND METHOD OF PREPARING THE SAME

CROSS REFERENCE TO RELATED APPLICATIONS

This Application claims priority of Taiwan Patent Application No. 110131249, filed on Aug. 24, 2021, the entirety of which is incorporated by reference herein.

TECHNICAL FIELD

The present disclosure relates to a ceramic composite and a method of preparing the same.

BACKGROUND

Because of the electronic configuration of aluminum, aluminum is a metal with high activity. Therefore, when metal aluminum smelting is performed at a high temperature, the metal aluminum is easy to be oxidized again, the result being that a portion of the metal aluminum will be oxidized to form aluminum oxide. In addition, since the raw materials usually contain water and other substances, metal aluminum may also be reacted to form other aluminum compounds during smelting.

In order to prevent the metal aluminum from being oxidized again in the high-temperature atmosphere, many salts are added during the high-temperature smelting process, and the salt reacts with the metal aluminum. Thus, aluminum-containing salts having a low melting point may float on the surface of the metal aluminum slurry since the specific gravity of the aluminum-containing salts is lower than that of the metal aluminum slurry. The aforementioned aluminum-containing salts having a low melting point are also called aluminum slag or aluminum furnace slag. In other words, the aluminum slag used as a protective layer may be formed on the surface of the metal aluminum slurry, so that the aluminum slag can isolate the metal aluminum slurry from the ambient gas and prevent the metal aluminum slurry from reacting with the ambient gas.

After the high temperature smelting process for metal aluminum is complete, the aluminum slag waste will be removed and discarded, and so that the aluminum slag seems valueless. In this case, in addition to the high cost of the high-temperature aluminum smelting process, the loss of aluminum may also cause environmental pollution and incur more waste-disposal costs.

SUMMARY

According to the present disclosure, one embodiment provides a method of preparing a ceramic composite. The method includes mixing an aluminum slag and a carbon accelerator to obtain a mixture and reacting the mixture at a temperature equal to or greater than 1600° C. in a nitrogen atmosphere to obtain the ceramic composite. The aluminum slag includes aluminum, oxygen, nitrogen, and magnesium. The weight ratio of the oxygen to the aluminum is 0.6 to 2. The weight ratio of the nitrogen to the aluminum is 0.1 to 1.2. The weight ratio of the magnesium to the aluminum is 0.04 to 0.2. The ceramic composite includes aluminum nitride accounting for at least 90 wt % of the ceramic composite.

According to the present disclosure, another embodiment provides a ceramic composite. The ceramic composite includes a first component and a second component. The first component accounts for 90 wt % to 99 wt % of the ceramic composite. The first component is aluminum nitride. The second component accounts for 1 wt % to 10 wt % of the ceramic composite. The second component includes magnesium, calcium, silicon, or a combination thereof.

The method of preparing the ceramic composite disclosed herein may be applied to aluminum slag containing different components according to requirements, so that the various aluminum slags may be reacted to the ceramic composites. In order to make the present disclosure more obvious and understandable, embodiments are listed below in conjunction with the accompanying drawings, which are described in detail as follows.

BRIEF DESCRIPTION OF THE DRAWINGS

Through the following detailed description and the accompanying drawings, a person of ordinary skill in the art will better understand the viewpoints of some embodiments of the present disclosure. It should be noted that, in accordance with standard practice in the industry, various features are not drawn to scale. In fact, the dimensions of the various features may be arbitrarily increased or reduced for clarity of discussion.

DETAILED DESCRIPTION

The following disclosure provides different embodiments or examples. Here, the terms "about", "substantially" and the like usually refer within 20% of a given value or range, or within 10%, or within 5%, or within 3%, or within 2%, or within 1%, or within 0.5%. It should be noted that the value provided in the disclosure is an approximate value. That is, the meaning of "about", "substantially" and the like can still be implied without a specific description of "about", "substantially" or the like.

In addition, the material composition, device, process, method, and step in the specific embodiments described in the specification do not limit the protection scope of the disclosure. A person of ordinary skill in the art will understand that current and future material composition, device, process, method, and step from the content disclosed in some embodiments of the present disclosure, as long as the current or future material composition, device, process, method, and step performs substantially the same functions or obtain substantially the same results as the present disclosure. Therefore, the scope of the present disclosure includes the above-mentioned material composition, device, process, method, and step. In addition, material composition, device, process, method, and step in the specification may be omitted. Moreover, each of the claims constitutes an individual embodiment, and the scope of the present disclosure also includes combinations of each of the claims and embodiments.

Figure 1:
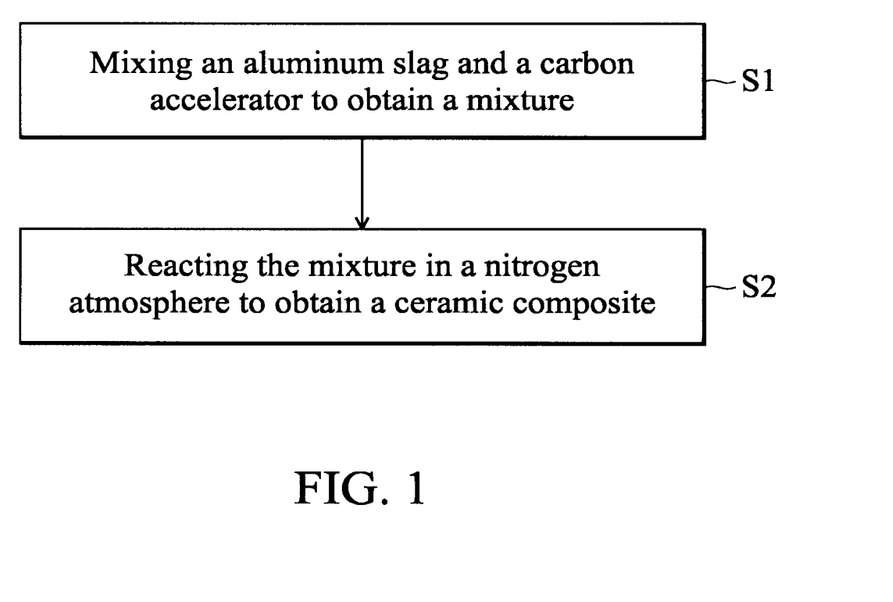
FIG. 1 is a flowchart of a method for preparing a ceramic composite according to some embodiments of the present disclosure.

Referring to FIG. 1, which is a flowchart of a method for preparing a ceramic composite according to some embodiments of the present disclosure.

In step S1, an aluminum slag and a carbon accelerator are mixed to obtain a mixture.

In some embodiments, the aluminum slag may be referred to as an aluminum-containing furnace slag. The aluminum slag may be an industrial by-product or industrial waste generated during the high temperature metal aluminum smelting and/or refining process. Generally, aluminum slag will be disposed in a landfill, but this method is prone to land pollution and odor problems, and even safety concerns about stacking due to heat generation. Therefore, the low-value industrial waste may be converted into a ceramic composite with high economic value by the method for preparing the ceramic composite disclosed herein.

In some embodiments, the aluminum slag may include metallic aluminum (Al), aluminum oxide (alumina, $Al_2O_3$), aluminum nitride (AlN), aluminum oxynitride (AlON), or a combination thereof.

In some embodiments, the aluminum slag may include aluminum atoms, oxygen atoms, nitrogen atoms, and magnesium atoms. In some embodiments, elemental analysis may be performed to measure the content of each atom in the aluminum slag. In some embodiments, the weight ratio of oxygen atoms to aluminum atoms (oxygen atoms/aluminum atoms) in the aluminum slag may be 0.6 to 2. In some embodiments, the weight ratio of oxygen atoms to aluminum atoms in the aluminum slag may be 0.6, 0.7, 0.8, 0.9, 1, 1.1, 1.2, 1.3, 1.4, 1.5, 1.6, 1.7, 1.8, 1.9, 2, or a range composed of any of the above values. For example, the weight ratio of oxygen atoms to aluminum atoms in the aluminum slag is 0.6 to 0.9, 0.7 to 0.85, 1 to 1.3, 1 to 1.4, 1.1 to 1.4, 1.2 to 1.5, or 1.5 to 1.7.

In some embodiments, the weight ratio of nitrogen atoms to aluminum atoms (nitrogen atoms/aluminum atoms) in the aluminum slag may be 0.1 to 1.2. In some embodiments, the weight ratio of nitrogen atoms to aluminum atoms in the aluminum slag may be 0.1, 0.2, 0.3, 0.4, 0.5, 0.6, 0.7, 0.8, 0.9, 1, 1.1, 1.2, or a range composed of any of the above values. For example, the weight ratio of nitrogen atoms to aluminum atoms in the aluminum slag is 0.1 to 0.3, 0.2 to 0.4, 0.3 to 0.6, 0.4 to 0.7, 0.8 to 1, or 0.9 to 1.1.

In some embodiments, the weight ratio of magnesium atoms to aluminum atoms (magnesium atoms/aluminum atoms) in the aluminum slag may be 0.04 to 0.2. In some embodiments, the weight ratio of magnesium atoms to aluminum atoms in the aluminum slag may be 0.04, 0.05, 0.06, 0.07, 0.08, 0.09, 0.1, 0.11, 0.12, 0.13, 0.14, 0.15, 0.16, 0.17, 0.18, 0.19, 0.2, or a range composed of any of the above values. For example, the weight ratio of magnesium atoms to aluminum atoms in the aluminum slag is 0.04 to 0.06, 0.07 to 0.1, 0.14 to 0.16, 0.15 to 0.17, 0.16 to 0.18, 0.17 to 0.19 or 0.18 to 0.2.

In addition, in some embodiments, the aluminum slag may further include carbon, silicon, calcium, sodium, potassium, or a combination thereof. For example, the aluminum slag may further include oxides, nitrides, and/or oxynitrides of carbon, silicon, calcium, sodium, potassium, or a combination thereof.

In some embodiments, the weight ratio of carbon atoms to aluminum atoms (carbon atoms/aluminum atoms) in the aluminum slag may be 0.2 to 0.6. In some embodiments, the weight ratio of carbon atoms to aluminum atoms in the aluminum slag may be 0.2, 0.3, 0.4, 0.5, 0.6, or a range composed of any of the above values. For example, the weight ratio of carbon atoms to aluminum atoms in the aluminum slag is 0.1 to 0.3, 0.2 to 0.4, 0.3 to 0.5, or 0.4 to 0.6. In other embodiments, the aluminum slag may substantially not include carbon atoms or the carbon atoms may substantially not be detected.

In some embodiments, the weight ratio of silicon atoms to aluminum atoms (silicon atoms/aluminum atoms) in the aluminum slag may be 0.01 to 0.2. In some embodiments, the weight ratio of silicon atoms to aluminum atoms in the aluminum slag may be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, or a range composed of any of the above values. For example, the weight ratio of silicon atoms to aluminum atoms in the aluminum slag is 0.01 to 0.03, 0.2 to 0.4, 0.3 to 0.5, or 0.4 to 0.6. In other embodiments, the aluminum slag may substantially not include silicon atoms or the silicon atoms may substantially not be detected.

In some embodiments, the weight ratio of calcium atoms to aluminum atoms (calcium atoms/aluminum atoms) in the aluminum slag may be 0.004 to 0.06. In some embodiments, the weight ratio of calcium atoms to aluminum atoms in the aluminum slag may be 0.004, 0.005, 0.006, 0.007, 0.008, 0.009, 0.01, 0.02, 0.03, 0.04, 0.05, 0.06, or a range composed of any of the above values. For example, the weight ratio of calcium atoms to aluminum atoms in the aluminum slag is 0.004 to 0.006, 0.005 to 0.007, 0.006 to 0.008, 0.01 to 0.03, 0.02 to 0.04, or 0.03 to 0.05.

In some embodiments, the content of sodium (Na) atoms and/or potassium (K) atoms in the aluminum slag is less than 2 wt %, for example, less than 1 wt % or less than 0.5 wt %. The weight ratio of sodium atoms and/or potassium atoms to aluminum atoms (sodium atoms/aluminum atoms and/or potassium atoms/aluminum atoms) in the aluminum slag may be 0.002 to 0.05. For example, the weight ratio of sodium atoms to aluminum atoms in the aluminum slag is 0.002 to 0.004, 0.003 to 0.005, 0.01 to 0.03, or 0.02 to 0.04. For example, the weight ratio of potassium atoms to aluminum atoms in the aluminum slag is 0.002 to 0.004, 0.003 to 0.005, 0.01 to 0.03, or 0.02 to 0.04.

In some embodiments, the aluminum slag includes carbon atoms, silicon atoms, and calcium atoms. In this embodiment, the weight ratio of carbon atoms to aluminum atoms in the aluminum slag may be 0.2 to 0.6. The weight of silicon atoms and aluminum atoms in the aluminum slag may be 0.01 to 0.2. The weight ratio of calcium atoms to aluminum atoms in the aluminum slag may be 0.004 to 0.06.

In some embodiments, the carbon accelerator may include activated carbon, graphite, or a combination thereof. In some embodiments, the weight of the carbon accelerator may be 10 wt % to 20 wt % of the total weight of the mixture. That is, the weight of the carbon accelerator is 10 wt % to 20 wt % of the total weight of the aluminum slag and the carbon accelerator. In some embodiments, the weight of the carbon accelerator may be 10 wt %, 11 wt %, 12 wt %, 13 wt %, 14 wt %, 15 wt %, 16 wt %, 17 wt %, 18 wt %, 19 wt %, 20 wt %, or a range composed of any of the above values of the total weight of the mixture. When the weight of the added carbon accelerator is less than 10 wt % of the total weight of the mixture, it may be difficult to completely react with aluminum slag. However, when the weight of the added carbon accelerator is greater than 20 wt % of the total weight of the mixture, it may cause the carbon accelerator to remain in the ceramic composite. Thus, the content of the aluminum nitride in the ceramic composite may be reduced. In some embodiments, the carbon accelerator may be removed at the same time when the subsequent heating process is performed.

In some embodiments, after step S1, the mixture may be further mixed with a binder, and then the subsequent step S2 may be continued. In some embodiments, the weight of the added binder may be 1 wt % to 5 wt % of the total weight of the mixture. In some embodiments, the weight of the added binder may be 1 wt %, 2 wt %, 3 wt %, 4 wt %, 5 wt %, or a range composed of any of the above values of the total weight of the mixture.

In some embodiments, the binder may be a polymer material that thermally cracks in a high-temperature atmosphere. In some embodiments, the binder may uniformly disperse and mix the aforementioned aluminum slag with the carbon accelerator. In some embodiments, the binder may include polyacetal, poly(methyl methacrylate) (PMMA), polyolefin compound, hydrocarbon wax, or a combination thereof. In some embodiments, the binder may be poly(methyl methacrylate).

In some embodiments, since the binder is a polymer material, when the aluminum slag, the carbon accelerator, and the binder are included in the mixture at the same time, the binder may help to complete the reaction more uniformly and quickly. Further, the binder may adjust the overall particle size. Moreover, the binder may help to store the aluminum slag in a more stable state.

In some embodiments, the mixture is mixed with the binder, granulation process, tableting process and/or pressure-forming process may be optionally further performed. For example, the granulation process or the tableting process may be performed by a granulator or tablet press so as to control the shape and size of the sample.

In step S2, the aforementioned mixture is reacted in the nitrogen atmosphere to obtain the ceramic composite.

In some embodiments, the main component of the nitrogen atmosphere is nitrogen gas, but may include a small amount of other gases, such as oxygen gas. For example, nitrogen gas occupies a volume percentage (v/v%) of more than 95% of the gas in the entire nitrogen atmosphere to obtain a ceramic composite with a high content of the aluminum nitride. In some embodiments, the pressure of the nitrogen atmosphere is 1 atm to 10 atm. For example, the pressure of the nitrogen atmosphere is 2 atm to 7 atm. The pressure of the nitrogen atmosphere may be 1 atm, 2 atm, 3 atm, 4 atm, 5 atm, 6 atm, 7 atm, 8 atm, 9 atm, 10 atm, or a range composed of any of the above values.

In some embodiments, the mixture may be reacted at the temperature equal to or greater than 1600° C. In some embodiments, the aforementioned mixture may be reacted at the high temperature of 1650° C. to 1900° C. For example, the aforementioned mixture is reacted at 1700° C., 1750° C., 1800° C., 1850° C., 1900° C., or a range composed of any of the above values. In some embodiments, the mixture may be reacted in a furnace.

In some embodiments, a reaction time of the aforementioned mixture may be 3 hours to 12 hours. When the reaction time is greater than 12 hours, additional process costs will increase. When the reaction time is less than 3 hours, the problem of incomplete reaction may be caused. In some embodiments, the reaction time may be 3 hours, 4 hours, 5 hours, 6 hours, 7 hours, 8 hours, 9 hours, 10 hours, 11 hours, 12 hours, or a range composed of any of the above values. In some embodiments, the reaction time may be 3 hours to 8 hours. For example, the reaction time may be 2 hours to 4 hours, 3 hours to 5 hours, or 4 hours to 6 hours. In some embodiments, the reaction time may be less than 5 hours. For example, it takes 4 hours of the reaction time to complete the reaction (as shown in the subsequent examples 3 and 5), and a ceramic composite is obtained.

In some embodiments, the ceramic composite prepared according to the foregoing steps S1 and S2 may include a first component and a second component. In some embodiments, an X-ray diffractometer may be used to analyze the composition of the ceramic composite. In some embodiments, aluminum nitride as the first component may account for 90 wt % to 99 wt % of the total weight of the ceramic composite. In some embodiments, aluminum nitride may account for at least 90 wt % of the total weight of the ceramic composite. For example, aluminum nitride may account for 90 wt %, 91 wt %, 92 wt %, 93 wt %, 94 wt %, 95 wt %, 96 wt %, 97 wt %, 98 wt %, 99 wt %, or a range composed of any of the above values of the ceramic composite.

In some embodiments, the particle size of aluminum nitride may be 2 um to 10 um. In some embodiments, the crystal phase of aluminum nitride may be a hexagonal crystal phase. Since the hexagonal crystal phase is a complete crystal structure, when the aluminum nitride in the ceramic composite has hexagonal crystal phase, the aluminum nitride may have excellent thermal conductivity. Therefore, the thermal conductivity of the ceramic composite including aluminum nitride may be improved.

In some embodiments, the second component may account for 1 wt % to 10 wt % of the ceramic composite. For example, the second component may account for 1 wt %, 2 wt %, 3 wt %, 4 wt %, 5 wt %, 6 wt %, 7 wt %, 8 wt %, 9 wt %, 10 wt %, or a range composed of any of the above values of the ceramic composite. In some embodiments, the second component may include magnesium, calcium, silicon, or a combination thereof. For example, the ceramic composite may include magnesium oxide, magnesium nitride, calcium oxide, calcium nitride, silicon oxide, silicon nitride, or a combination thereof.

In some embodiments, the magnesium atoms in the ceramic composite may account for 1 wt % to 3 wt % of the ceramic composite. For example, the magnesium atoms in the ceramic composite may account for 1 wt %, 1.5 wt %, 2 wt %, 2.5 wt %, 3 wt %, or a range composed of any of the above values of the ceramic composite. In some embodiments, the silicon atoms in the ceramic composite may account for 4 wt % to 8 wt % of the ceramic composite. For example, the silicon atoms in the ceramic composite may account for 4 wt %, 4.5 wt %, 5 wt %, 5.5 wt %, 6 wt %, 6.5 wt %, 7 wt %, 7.5 wt %, 8 wt %, or a range composed of any of the above values of the ceramic composite. In some embodiments, the calcium atoms in the ceramic composite may account for 0.05 wt % to 3 wt % of the ceramic composite. For example, the calcium atoms in the ceramic composite may account for 0.05 wt %, 0.1 wt %, 0.5 wt %, 1 wt %, 1.5 wt %, 2 wt %, 2.5 wt %, 3 wt %, or a range composed of any of the above values of the ceramic composite.

In some embodiments, the ceramic composite may substantially not include carbon atoms. In other words, when using, for example, the X-ray diffractometer for analysis, the content of carbon atoms in the ceramic composite may be less than the minimum detection amount of the X-ray diffractometer. Therefore, the content of carbon atoms in the ceramic composite may not be measured. When the weight of the carbon atoms in the ceramic composite is too high, the conductive properties of the ceramic composite may be improved, which is not suitable for the application of heat dissipation adhesive. Therefore, the present disclosure may control the content of carbon atoms in the ceramic composite to be lower than the minimum detection amount of the detecting instrument, and therefore the ceramic composite of the present disclosure may be suitable for use in heat dissipation adhesives. In addition, since the ceramic composite of the present disclosure may substantially not include carbon atoms, when subsequently applied to the sintering reaction, the ceramic composite of the present disclosure may avoid the problem of voids in the sinter due to residual carbon. Therefore, the sintered product obtained by sintering the ceramic composite of the present disclosure may have a relatively high sintered density, and accordingly have a relatively high strength of the sintered block.

In order to make the above and other purposes and advantages of the present disclosure more obvious and understandable, the following embodiments are listed below. The detailed descriptions are as follows.

In each embodiment, the aluminum slag or commercial alumina were selected as the reactant for the reaction. The specific composition of the aluminum slag was shown in Table 1. Table 1 showed the weight percentage (wt %) of each element in the total weight of the aluminum slag. In some embodiments, EDS (energy dispersive X-ray spectroscopy, model: JEOL JCM-7000) was used to obtain the data shown in Table 1. The commercial alumina was AES-11C (manufacturer: the Sumitomo Chemical Company). In each embodiment, the graphite powder was selected as the carbon accelerator. DURAMAX B-1000 (manufacturer: the Dow Chemical Company) was selected as the binder.

TABLE 1

| | Number of aluminum slag | | | |
|---|---|---|---|---|
| | aluminum slag 1 | aluminum slag 2 | aluminum slag 3 | aluminum slag 4 |
| Element (wt %) | | | | |
| carbon (C) | 8.73 | 10.48 | 9.98 | 0 |
| nitrogen (N) | 18.64 | 14.94 | 8.34 | 27.51 |
| oxygen (O) | 27.37 | 35.63 | 39.37 | 38.87 |
| magnesium (Mg) | 1.84 | 3.51 | 5.92 | 4.68 |
| aluminum (Al) | 33.28 | 22.17 | 30.34 | 28.65 |
| silicon (Si) | 3.31 | 3.87 | 0.55 | 0 |
| calcium (Ca) | 1.32 | 0.61 | 0.77 | 0.17 |
| sodium (Na) | 0.14 | 0.06 | 0.65 | 0.07 |
| potassium (K) | 0.21 | 0.32 | 1.50 | 0.15 |
| Weight ratio of elements (wt %/wt %) | | | | |
| carbon/aluminum | 0.262 | 0.473 | 0.329 | 0 |
| nitrogen/aluminum | 0.56 | 0.674 | 0.275 | 0.96 |
| oxygen/aluminum | 0.822 | 1.607 | 1.298 | 1.357 |
| magnesium/aluminum | 0.055 | 0.158 | 0.195 | 0.163 |
| silicon/aluminum | 0.099 | 0.175 | 0.018 | 0 |
| calcium/aluminum | 0.04 | 0.028 | 0.025 | 0.006 |
| sodium/aluminum | 0.0042 | 0.0027 | 0.0214 | 0.00244 |
| potassium/aluminum | 0.0063 | 0.0144 | 0.0494 | 0.00523 |

For ease of description, parameters of the reaction of each embodiment were listed in Table 2. In the following embodiments, the reaction was occurred in the high-temperature furnace. If the pressure-forming process was performed, the pressure of 200 kg/cm$^3$ was applied for 30 seconds.

TABLE 2

| Embodiment | Mixture | Binder | Pressure-forming | Temperature (° C.) | Pressure (atm) | Time (hour) |
|---|---|---|---|---|---|---|
| 1 | 85 wt % aluminum slag 1<br>15 wt % graphite powder | 3 wt % | with | 1800 | 6 | 6 |
| 2 | 85 wt % aluminum slag 4<br>15 wt % graphite powder | 3 wt % | with | 1800 | 6 | 6 |
| 3 | 85 wt % aluminum slag 1<br>15 wt % graphite powder | 3 wt % | without | 1800 | 6 | 4 |
| 4 | 85 wt % aluminum slag 1<br>15 wt % graphite powder | 3 wt % | without | 1700 | 6 | 6 |
| 5 | 85 wt % aluminum slag 1<br>15 wt % graphite powder | without | without | 1800 | 6 | 4 |
| 6 | 85 wt % aluminum slag 1<br>15 wt % graphite powder | 3 wt % | with | 1600 | 6 | 6 |
| 7 | 85 wt % aluminum slag 1<br>15 wt % graphite powder | 3 wt % | with | 1400 | 6 | 6 |
| 8 | 85 wt % aluminum slag 1<br>15 wt % graphite powder | 3 wt % | with | 1230 | 6 | 6 |
| 9 | 90 wt % aluminum slag 1<br>10 wt % graphite powder | 3 wt % | with | 1800 | 6 | 4 |
| 10 | 70 wt % commercial alumina<br>30 wt % graphite powder | 3 wt % | with | 1600 | 6 | 6 |
| 11 | 70 wt % commercial alumina<br>30 wt % graphite powder | 3 wt % | with | 1700 | 6 | 6 |
| 12 | 70 wt % commercial alumina<br>30 wt % graphite powder | 3 wt % | with | 1800 | 6 | 6 |
| 13 | 85 wt % commercial alumina<br>15 wt % graphite powder | 3 wt % | without | 1800 | 6 | 4 |
| 14 | 85 wt % commercial alumina<br>15 wt % graphite powder | without | without | 1800 | 6 | 4 |

EMBODIMENT 1

8.5 grams (g) of aluminum slag 1 was mixed with 1.5 g of graphite powder to obtain the mixture 1. Further, 0.3 g of binder was added into the mixture 1 and mixed with the mixture 1 to obtain the mixture 1'. Then, the mixture 1' was pressure-formed at pressure of 200 kg/cm$^3$ for 30 seconds to form a tablet. The tablet was reacted at temperature of 1800° C. in a nitrogen atmosphere with pressure of 6 atm for 6 hours in the furnace, so that the tablet was converted into the ceramic composite 1.

EMBODIMENT 2

Similar to the embodiment 1, 8.5 grams (g) of aluminum slag 4 was mixed with 1.5 g of graphite powder to obtain the mixture 2. Further, 0.3 g of binder was added into the mixture 2 and mixed with the mixture 2 to obtain the mixture 2'. Then, the mixture 2' was pressure-formed at pressure of 200 kg/cm$^3$ for 30 seconds to form a tablet. The tablet was reacted at temperature of 1800° C. in a nitrogen atmosphere with pressure of 6 atm for 6 hours in the furnace, so that the tablet was converted into the ceramic composite 2.

EMBODIMENT 3

Similar to the embodiment 1, 8.5 grams (g) of aluminum slag 1 was mixed with 1.5 g of graphite powder to obtain the mixture 3. Further, 0.3 g of binder was added into the mixture 3 and mixed with the mixture 3 to obtain the mixture 3'. The pressure-forming process did not be performed. The mixture 3' was directly reacted at temperature of 1800° C. in a nitrogen atmosphere with pressure of 6 atm for 4 hours in the furnace, so that the mixture 3' was converted into the ceramic composite 3.

EMBODIMENT 4

Similar to the embodiment 1, 8.5 grams (g) of aluminum slag 1 was mixed with 1.5 g of graphite powder to obtain the mixture 4. Further, 0.3 g of binder was added into the mixture 4 and mixed with the mixture 4 to obtain the mixture 4'. The pressure-forming process did not be performed. The mixture 4' was directly reacted at temperature of 1700° C. in a nitrogen atmosphere with pressure of 6 atm for 6 hours in the furnace, so that the mixture 4' was converted into the ceramic composite 4.

EMBODIMENT 5

Similar to the embodiment 1, 8.5 grams (g) of aluminum slag 1 was mixed with 1.5 g of graphite powder to obtain the mixture 5. The mixture 5 was directly reacted at temperature of 1800° C. in a nitrogen atmosphere with pressure of 6 atm for 4 hours in the furnace, so that the mixture 5 was converted into the ceramic composite 5.

EMBODIMENT 6

Similar to the embodiment 1, 8.5 grams (g) of aluminum slag 1 was mixed with 1.5 g of graphite powder to obtain the mixture 6. Further, 0.3 g of binder was added into the mixture 6 and mixed with the mixture 6 to obtain the mixture 6'. Then, the mixture 6' was pressure-formed at pressure of 200 kg/cm$^3$ for 30 seconds to form a tablet. The tablet was reacted at temperature of 1600° C. in a nitrogen atmosphere with pressure of 6 atm for 6 hours in the furnace, so that the tablet was converted into the ceramic composite 6.

EMBODIMENT 7

Similar to the embodiment 1, 8.5 grams (g) of aluminum slag 1 was mixed with 1.5 g of graphite powder to obtain the mixture 7. Further, 0.3 g of binder was added into the mixture 7 and mixed with the mixture 7 to obtain the mixture 7'. Then, the mixture 7' was pressure-formed at pressure of 200 kg/cm$^3$ for 30 seconds to form a tablet. The tablet was reacted at temperature of 1400° C. in a nitrogen atmosphere with pressure of 6 atm for 6 hours in the furnace, so that the tablet was converted into the ceramic composite 7.

EMBODIMENT 8

Similar to the embodiment 1, 8.5 grams (g) of aluminum slag 1 was mixed with 1.5 g of graphite powder to obtain the mixture 8. Further, 0.3 g of binder was added into the mixture 8 and mixed with the mixture 8 to obtain the mixture 8'. Then, the mixture 8' was pressure-formed at pressure of 200 kg/cm$^3$ for 30 seconds to form a tablet. The tablet was reacted at temperature of 1230° C. in a nitrogen atmosphere with pressure of 6 atm for 6 hours in the furnace, so that the tablet was converted into the ceramic composite 8.

EMBODIMENT 9

Similar to the embodiment 1, 9 grams (g) of aluminum slag 1 was mixed with 1 g of graphite powder to obtain the mixture 9. Further, 0.3 g of binder was added into the mixture 9 and mixed with the mixture 9 to obtain the mixture 9'. Then, the mixture 9' was pressure-formed at pressure of 200 kg/cm$^3$ for 30 seconds to form a tablet. The tablet was reacted at temperature of 1800° C. in a nitrogen atmosphere with pressure of 6 atm for 4 hours in the furnace, so that the tablet was converted into the ceramic composite 9.

EMBODIMENT 10

7 grams (g) of commercial alumina was mixed with 3 g of graphite powder to obtain the mixture 10. Further, 0.3 g of binder was added into the mixture 10 and mixed with the mixture 10 to obtain the mixture 10'. Then, the mixture 10' was pressure-formed at pressure of 200 kg/cm$^3$ for 30 seconds to form a tablet. The tablet was reacted at temperature of 1600° C. in a nitrogen atmosphere with pressure of 6 atm for 6 hours in the furnace, so that the tablet was converted into the ceramic composite 10.

EMBODIMENT 11

Similar to the embodiment 10, 7 grams (g) of commercial alumina was mixed with 3 g of graphite powder to obtain the mixture 11. Further, 0.3 g of binder was added into the mixture 11 and mixed with the mixture 11 to obtain the mixture 11'. Then, the mixture 11' was pressure-formed at pressure of 200 kg/cm$^3$ for 30 seconds to form a tablet.

The tablet was reacted at temperature of 1700° C. in a nitrogen atmosphere with pressure of 6 atm for 6 hours in the furnace, so that the tablet was converted into the ceramic composite 11.

EMBODIMENT 12

Similar to the embodiment 10, 7 grams (g) of commercial alumina was mixed with 3 g of graphite powder to obtain the mixture 12. Further, 0.3 g of binder was added into the mixture 12 and mixed with the mixture 12 to obtain the mixture 12'. Then, the mixture 12' was pressure-formed at pressure of 200 kg/cm$^3$ for 30 seconds to form a tablet. The tablet was reacted at temperature of 1800° C. in a nitrogen atmosphere with pressure of 6 atm for 6 hours in the furnace, so that the tablet was converted into the ceramic composite 12.

EMBODIMENT 13

8.5 grams (g) of commercial alumina was mixed with 1.5 g of graphite powder to obtain the mixture 13. Further, 0.3 g of binder was added into the mixture 13 and mixed with the mixture 13 to obtain the mixture 13'. The mixture 13' was reacted at temperature of 1800° C. in a nitrogen atmosphere with pressure of 6 atm for 4 hours in the furnace, so that the mixture 13' was converted into the ceramic composite 13.

EMBODIMENT 14

8.5 grams (g) of commercial alumina was mixed with 1.5 g of graphite powder to obtain the mixture 14. The mixture 14 was reacted at temperature of 1800° C. in a nitrogen atmosphere with pressure of 6 atm for 4 hours in the furnace, so that the mixture 14 was converted into the ceramic composite 14.

Then, the ceramic composite 1 to ceramic composite 14 obtained in Embodiment 1 to Embodiment 14 were analyzed as follow.

SEM Analysis

Figure 2:
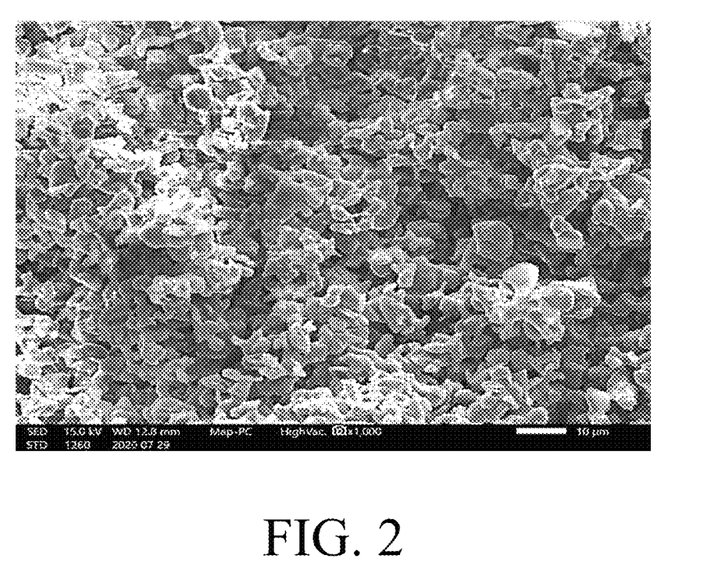
FIG. 2 is a SEM (scanning electron microscope) image of the ceramic composite prepared by the preparation method of the present disclosure according to some embodiments of the present disclosure.

Referring to FIG. 2, which is an electron microscope image of the ceramic composite. Specifically, FIG. 2 showed the electron microscope image of the ceramic composite 1. The electron microscope was JCM-7000 (manufacturer: JEOL).

As shown in FIG. 2, the crystal phase of the ceramic composite 1 was a hexagonal crystal phase. In addition, since the structure shown in FIG. 2 was a complete structure, the thermal conductivity was well. Similarly, ceramic composites 2 to 5 also had well thermal conductivity properties.

Thermal Conductivity Analysis

Furthermore, the ceramic composite 1 was ground. The ceramic composite 1 was mixed with silicone at a weight ratio of 75:25, so that the ceramic composite 1 was dispersed in the silicone, and the thermal conductivity of the ceramic composite 1 was measured. As a result, the thermal conductivity of the ceramic composite 1 was 1.10 W/mK, which was better than commercial alumina (0.48 W/mK) and close to commercial aluminum nitride (1.39 W/mK). It was shown that, the ceramic composite 1 obtained by the method for preparing the ceramic composite of the present disclosure may be a well thermal conductive material. Similarly, ceramic composites 2 to 5 also had well thermal conductivity properties.

X-Ray Diffractometer Analysis

The ceramic composite 1 to the ceramic composite 14 were analyzed by the X-ray diffraction analyzer, and the characteristic peaks of the ceramic composites are used for quantification. The X-ray diffraction analyzer was X'PERT PRO (manufacturer: Malvern Panalytical).

As a result, the ceramic composite 1 to the ceramic composite 5 and ceramic composite 9 included aluminum nitride accounting for at least 90 wt % of the total weight of the ceramic composite, and substantially not include carbon. The ceramic composites 6, 13, and 14 included aluminum nitride and aluminum oxynitride, and the aluminum oxynitride may be generated by residual or incomplete reaction. The ceramic composites 7 and 8 included incompletely reacted aluminum oxynitride. The ceramic composites 10 to 12 included aluminum nitride and carbon.

For a brief description, the following shows a detailed description of X-ray diffraction analysis using ceramic composites 1, 6, 7, and 10 as examples.

Figure 3:
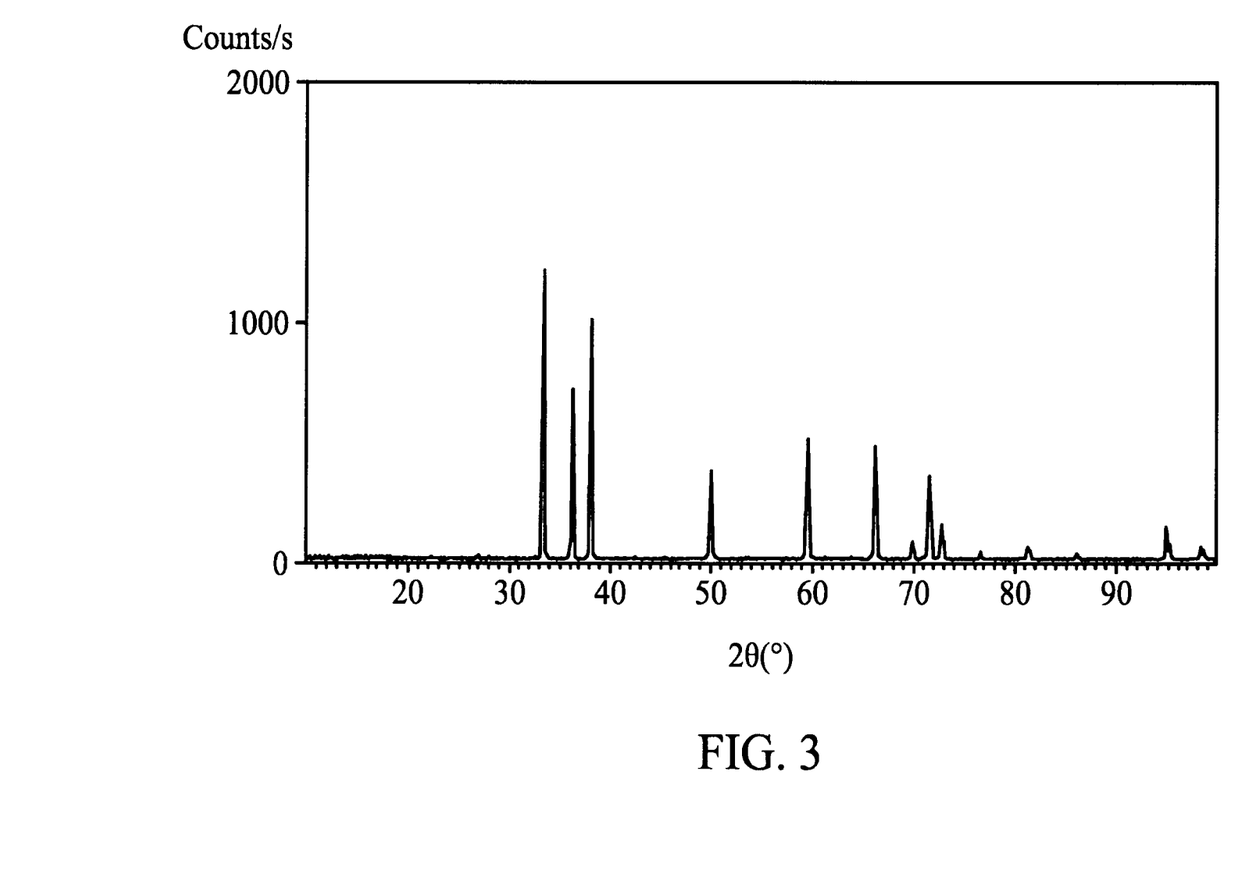
FIGS. 3 to 6 show XRD (X-ray diffraction) images of the ceramic composite prepared by the preparation method of the present disclosure according to some embodiments of the present disclosure.
Figure 4:
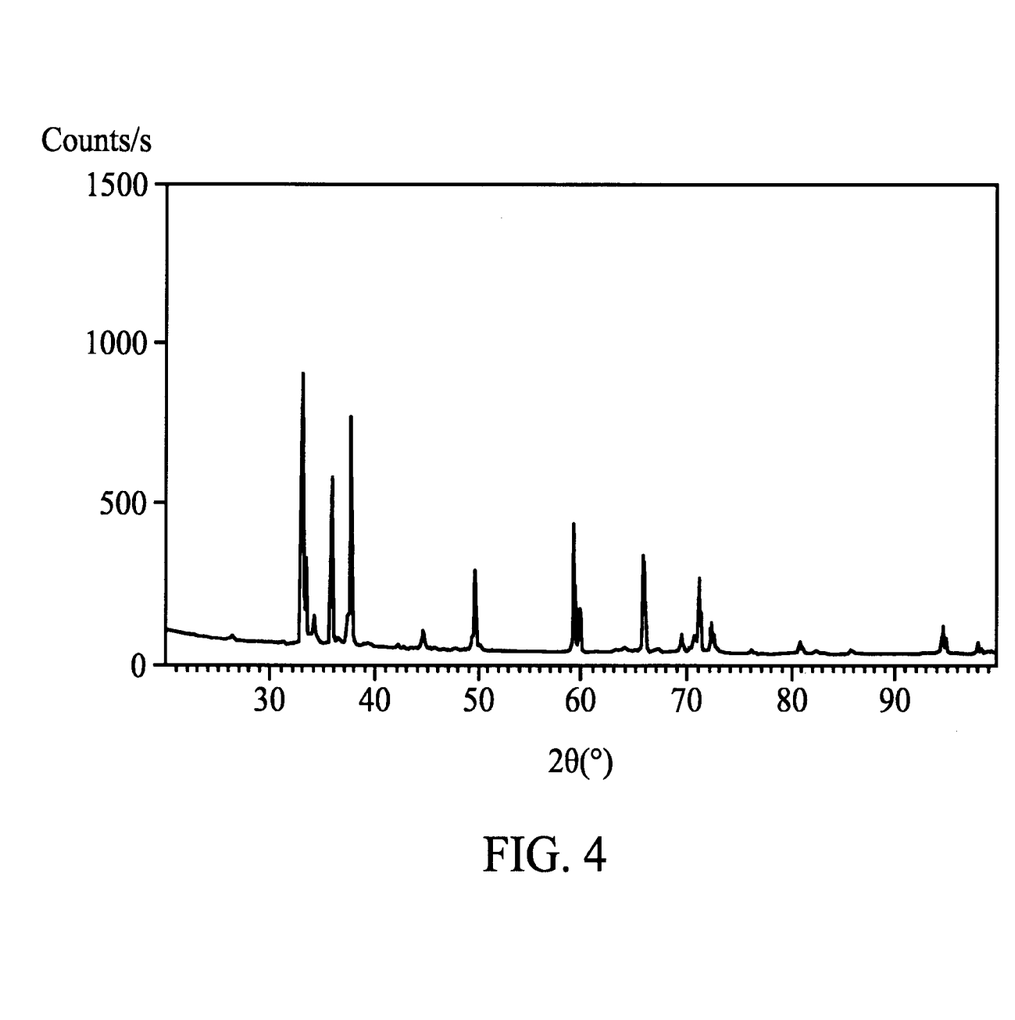
Figure 5:
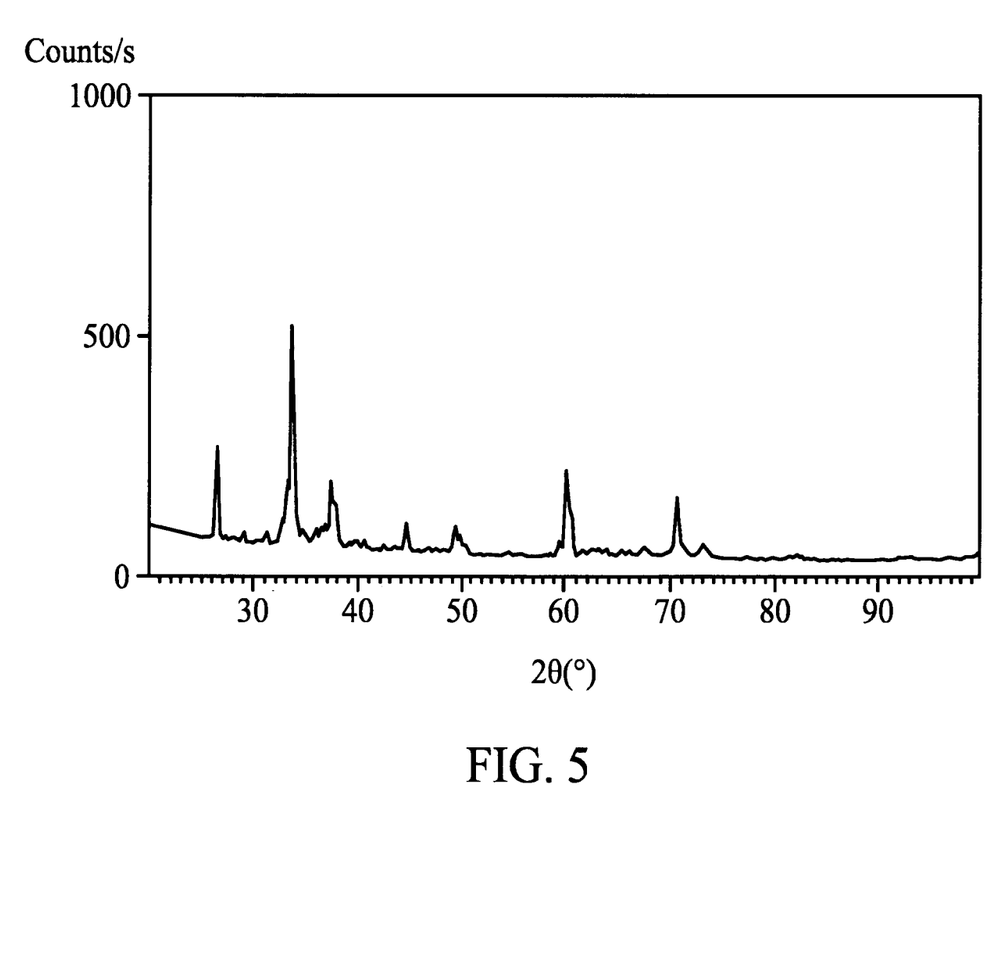
Figure 6:
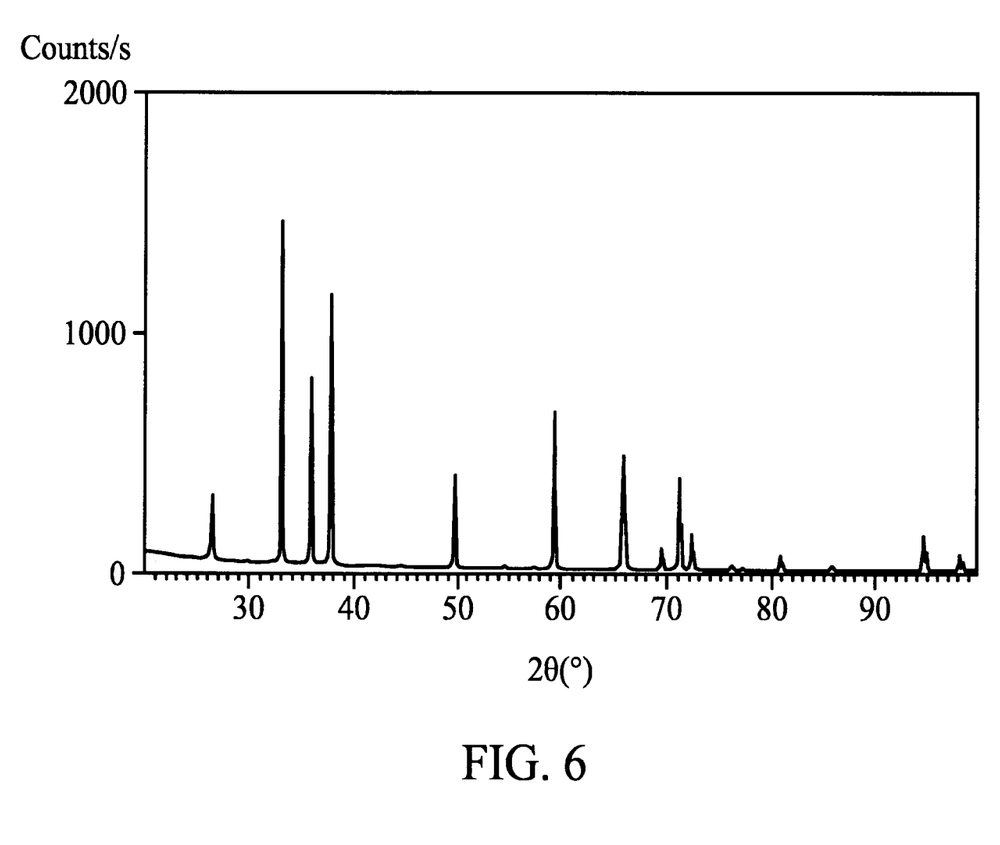

Referring to FIGS. 3 to 6, which show the X-ray diffraction diagrams of the ceramic composites obtained by the preparation method of the present disclosure. Specifically, FIG. 3 is an X-ray diffraction diagram of the ceramic composite 1. FIG. 4 is an X-ray diffraction diagram of the ceramic composite 6. FIG. 5 is an X-ray diffraction diagram of the ceramic composite 7. FIG. 6 is an X-ray diffraction diagram of the ceramic composite 10.

As shown in FIG. 3, the characteristic peaks of aluminum nitride are shown at 33.2°, 36° and 38°, and the characteristic peaks are used to quantification. Thus, it may be found that the ceramic composite 1 includes at least the 90 wt % aluminum nitride of the ceramic composite 1. In addition, since no characteristic peak is shown at about 26.5° in FIG. 3, it represents that the ceramic composite 1 substantially not include carbon. Similarly, the ceramic composites 2 to 5 and 9 also include aluminum nitride accounting for at least 90 wt % of the ceramic composite, and substantially not include carbon.

As shown in FIG. 4, the characteristic peaks of aluminum nitride are shown at 33.2°, 36°, and 38°, and the characteristic peaks of aluminum oxynitride are shown at about 34° to 35°. Therefore, the ceramic composite 6 includes aluminum nitride and aluminum oxynitride. It may be found that due to the insufficient reaction temperature of Embodiment 6, the ceramic composite 6 includes incompletely reacted aluminum oxynitride, resulting in that the content of aluminum nitride included in the ceramic composite 6 is less than 90 wt % of the total weight of the ceramic composite 6. Similarly, due to the insufficient amount of carbon in Embodiments 13 and 14, the ceramic composites 13 and 14 include incompletely reacted aluminum oxynitride.

As shown in FIG. 5, the characteristic peak of carbon is shown at about 26.5°, and the characteristic peak of aluminum oxynitride is shown at about 34° to 35°. Therefore, the ceramic composite 7 includes carbon and oxynitride. Due to the insufficient reaction temperature of Embodiment 7, the ceramic composite 7 also includes incompletely reacted aluminum oxynitride. Similarly, due to the insufficient reaction temperature of Embodiment 8, the ceramic composite 8 also includes incompletely reacted aluminum oxynitride.

As shown in FIG. 6, the characteristic peak of carbon is shown at approximately 26.5°, and the characteristic peaks of aluminum nitride are shown at 33.2°, 36°, and 38°. Therefore, ceramic composite 10 includes carbon and aluminum nitride. Since the amount of the carbon accelerator of Embodiment 10 is too high, the ceramic composite 10 includes incompletely reacted carbon. Similarly, because the amounts of the carbon accelerators in Embodiments 11 and 12 are too high, the ceramic composites 11 and 12 also include incompletely reacted carbon.

In some embodiments, Embodiment 1 is as an example to perform the ICP (inductively coupled plasma atomic emission spectroscopy) analysis to analyze the preparation methods of the ceramic composites of the present disclosure. That is, the analysis of the aluminum slag composition after the nitriding reaction is performed. The results are shown in Table 3. n is the number of repeated analyses, and s is the standard deviation of the repeated analyses.

TABLE 3

| Element (wt %) | Element weight percentage after the nitriding reaction (wt %) |
| --- | --- |
| aluminum (Al) | 55.76 (n = 3, s = 0.67) |
| magnesium (Mg) | 1.15 (n = 3, s = 0.02) |
| calcium (Ca) | 0.07 (n = 3, s = 0.001) |
| silicon (Si) | 6.24 (n = 3, s = 0.05) |
| sodium (Na) | <0.005 (n = 3) |
| potassium (K) | <0.005 (n = 3) |

As shown in Table 3, after performing the method of preparing the ceramic composite of the present disclosure, the contents of sodium and potassium in the aluminum slag are greatly reduced to be difficult to measure. Since the preparation method of the ceramic composite disclosed herein is to carry out the nitriding reaction at the temperature equal to or greater than 1600° C., the reaction temperature is significantly higher than the boiling point of sodium (833° C.) and the boiling point of potassium (759° C.). Thus, the sodium and potassium in the aluminum slag are vaporized. After vaporizing the sodium and the potassium in the aluminum slag, voids are generated in the aluminum slag. Therefore, the nitrogen gas is more easily to enter into the aluminum slag. The nitriding reaction is performed more completely to obtain high content of aluminum nitride. In addition, the contents of magnesium and calcium in the aluminum slag are also greatly reduced. Therefore, the magnesium and calcium in the aluminum slag may also be partially vaporized and voids are generated in the aluminum slag to further promote the nitriding reaction.

In summary, as shown in the foregoing Embodiments 1 to 14, with the same carbon accelerator content, compared with commercially available aluminum nitride powder, the reaction by using aluminum slag may obtain higher content of aluminum nitride. In detail, since the aluminum slag disclosed herein includes highly active metals such as magnesium and calcium, they may help combustion. That is, highly active metals may combine with oxygen atoms, so the highly active metals may promote the nitriding reaction of the aluminum slag, thereby obtaining a higher content of aluminum nitride. Moreover, since the aluminum slag disclosed in the present disclosure may include metal aluminum, aluminum nitride, and aluminum oxynitride, compared to commercially available aluminum nitride powder, in the presence of metal aluminum, aluminum nitride, and aluminum oxynitride, the metal aluminum may more easily react with nitrogen atoms in a nitrogen atmosphere to obtain a higher content of aluminum nitride. Furthermore, due to the addition of the carbon accelerator such as graphite powder in a specific ratio, the nitriding reaction of aluminum slag may be further promoted when the graphite powder may also be combined with oxygen atoms.

In addition, in the reaction process of reacting aluminum slag into a ceramic composite, part of the components in the aluminum slag, such as sodium and potassium, may vaporize at the reaction temperature. Thus, voids are generated in the aluminum slag to make the nitrogen gas in the nitrogen atmosphere easily enter into the aluminum slag, thereby promoting the nitriding reaction of the aluminum slag. It is also precisely because part of the components in the aluminum slag will vaporize, so the content of aluminum nitride in the ceramic composite obtained by reacting the aluminum slag may be at least 90 wt %.

Besides, the magnesium, calcium, silicon and their compounds included in the aluminum slag will align in the aluminum slag to generate vacancies and free electrons, so they help to improve the reactivity of the aluminum slag, thereby promoting removing the oxygen of the alumina in the aluminum slag and combing with nitrogen. Thus, the nitriding reaction of aluminum slag is further promoted.

In summary, according to some embodiments of the present disclosure, the aluminum slag is reacted into a ceramic composite with great added value, so as to increase the application value of the aluminum slag and reduce the cost of manufacturing the ceramic composite. In the preparation method of the ceramic composite described herein, the aluminum slag may be reacted by adding a carbon accelerator. In addition, with the preparation method described herein, the reaction may be completed in a shorter reaction time, so that the manufacturing process cost may be greatly reduced. Furthermore, the ceramic composite obtained after reacting the aluminum slag does not include residual carbon accelerator, so a ceramic composite with high purity of aluminum nitride may be provided.

In addition, due to the low carbon content in the ceramic composite, it is possible to avoid the problem of excessively high conductive properties that are not suitable for heat dissipation applications such as heat dissipation adhesive. Furthermore, since the ceramic composite includes magnesium, calcium, silicon, a combination thereof, or a compound thereof, the ceramic composite may be further used for sintering applications. For example, since the ceramic composite includes magnesium, calcium, silicon, a combination thereof, or a compound thereof, they may help reduce the temperature required for sintering, promote the sintering reaction, and/or increase the density of the sintered material.

According to some embodiments of the present disclosure, the aluminum nitride contained in the aluminum slag easily reacts with vapor to generate ammonia when the aluminum slag is placed in the atmosphere. Therefore, if the aluminum slag is stored in an improper environment, it is easy to produce a pungent odor and cause harm to human health. In addition, metal aluminum in a metallic state is easily oxidized and releases heat, which causes the temperature of the aluminum slag to increase to induce safety problems in storage. Therefore, the preparation method described herein may effectively improve environmental pollution, human health hazards, and storage safety concerns.

The foregoing outlines features of several embodiments of the present disclosure, so that a person of ordinary skill in the art may better understand the aspects of the present disclosure. A person of ordinary skill in the art should appreciate that, the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method of preparing a ceramic composite, comprising:
mixing an aluminum slag and a carbon accelerator to obtain a mixture, wherein the aluminum slag comprises aluminum, oxygen, nitrogen, and magnesium, a weight ratio of the oxygen to the aluminum is 0.6 to 2, a weight ratio of the nitrogen to the aluminum is 0.1 to 1.2, and a weight ratio of the magnesium to the aluminum is 0.04 to 0.2; and
reacting the mixture at a temperature equal to or greater than 1600° C. in a nitrogen atmosphere to obtain the ceramic composite, wherein the ceramic composite comprises aluminum nitride accounting for at least 90 wt % of the ceramic composite.

2. The method as claimed in claim 1, wherein the aluminum slag further comprises carbon, silicon, calcium, sodium, potassium, or a combination thereof.

3. The method as claimed in claim 1, wherein the aluminum slag further comprises carbon, and a weight ratio of the carbon to the aluminum is 0.2 to 0.6.

4. The method as claimed in claim 1, wherein the aluminum slag further comprises silicon, and a weight ratio of the silicon to the aluminum is 0.01 to 0.2.

5. The method as claimed in claim 1, wherein the aluminum slag further comprises calcium, and a weight ratio of the calcium to the aluminum is 0.004 to 0.06.

6. The method as claimed in claim 1, wherein the aluminum slag further comprises sodium, and a weight ratio of the sodium to the aluminum is 0.002 to 0.05.

7. The method as claimed in claim 1, wherein the aluminum slag further comprises potassium, and a weight ratio of the potassium to the aluminum is 0.002 to 0.05.

8. The method as claimed in claim 1, wherein the aluminum slag further comprises carbon, silicon and calcium, a weight ratio of the carbon to the aluminum is 0.2 to 0.6, a weight ratio of the silicon to the aluminum is 0.01 to 0.2, and a weight ratio of the calcium to the aluminum is 0.004 to 0.06.

9. The method as claimed in claim 1, wherein the mixture is reacted for 3 to 12 hours.

10. The method as claimed in claim 1, wherein a pressure of the nitrogen atmosphere is 1 atm to 10 atm.

11. The method as claimed in claim 1, wherein the mixture is reacted at the temperature of 1650° C. to 1900° C.

12. The method as claimed in claim 1, wherein the carbon accelerator comprises activated carbon, graphite, or a combination thereof.

13. The method as claimed in claim 1, wherein the carbon accelerator accounts for 10 wt % to 20 wt % of the mixture.

14. The method as claimed in claim 13, wherein the carbon accelerator comprises activated carbon, graphite, or a combination thereof.

15. The method as claimed in claim 1, further comprising:
mixing the mixture with a binder, wherein a weight of the binder is 1 wt % to 5 wt % of a total weight of the mixture.

16. The method as claimed in claim 15, wherein the binder comprises polyacetal, poly(methyl methacrylate), polyolefin compound, hydrocarbon wax, or a combination thereof.

17. The method as claimed in claim 1, wherein a crystal phase of the aluminum nitride is a hexagonal crystal phase.

* * * * *